United States Patent [19]

Ebenstein

[11] Patent Number: 5,319,567

[45] Date of Patent: Jun. 7, 1994

[54] NON-CONTACT METHOD OF OBTAINING DIMENSIONAL INFORMATION ABOUT A REFERENCE FEATURE OF AN OBJECT

[75] Inventor: Samuel E. Ebenstein, Southfield, Mich.

[73] Assignee: Ford Motor Company, Dearborn, Mich.

[21] Appl. No.: 161,025

[22] Filed: Dec. 3, 1993

Related U.S. Application Data

[63] Continuation-in-part of Ser. No. 980,419, Nov. 23, 1992.

[51] Int. Cl.$^5$ ............................................. G01B 11/02
[52] U.S. Cl. ................................. 364/474.34; 356/1; 356/3; 382/8; 382/16; 382/22
[58] Field of Search ............................... 364/560–563, 364/525, 526, 474.24, 474.26, 474.34; 382/8, 16, 17, 22; 356/1-3

[56] References Cited

U.S. PATENT DOCUMENTS

| | | | |
|---|---|---|---|
| 4,118,730 | 10/1978 | Lemelson | 358/93 |
| 4,239,388 | 12/1980 | Green | 356/5 |
| 4,240,745 | 12/1980 | Green | 356/5 |
| 4,437,151 | 3/1984 | Hurt et al. | 364/474.34 |
| 4,488,173 | 12/1984 | DiMatteo et al. | 364/559 |
| 4,596,037 | 6/1986 | Bouchard et al. | 382/8 |
| 4,630,225 | 12/1986 | Hisano | 364/559 |
| 4,724,330 | 2/1988 | Tuhro | 250/578 |
| 4,724,525 | 2/1988 | Purcell et al. | 364/474.34 |
| 4,759,074 | 7/1988 | Iadipaolo et al. | 382/23 |
| 4,864,227 | 9/1989 | Sato | 364/559 |
| 4,878,169 | 10/1989 | Toner et al. | 364/413.19 |
| 4,972,311 | 11/1990 | Holdgrafer et al. | 364/474.34 |

FOREIGN PATENT DOCUMENTS

0056758  4/1983  Japan ........................ 364/474.34

Primary Examiner—Jack B. Harvey
Assistant Examiner—Craig Steven Miller
Attorney, Agent, or Firm—Roger L. May; Richard D. Dixon

[57] ABSTRACT

Reference or analytic features such as intake and exhaust valves and valve guides are located in an area of a workpiece or part such as a cylinder head, the surface of which is laser scanned to obtain laser scan data. The scan data provides a fine grid of height (Z) values of the part. The part is scanned along lines with constant x or constant y. The method uses a graphical interface and least squares techniques to determine a reference plane for the desired analytic feature. Image processing techniques are then used to extract the desired feature and its boundary. Finally, techniques are used to calculate the precise dimensions of the analytic feature.

3 Claims, 10 Drawing Sheets

NON-CONTACT METHOD OF OBTAINING DIMENSIONAL INFORMATION ABOUT A REFERENCE FEATURE OF AN OBJECT

CROSS-REFERENCE TO RELATED APPLICATION

This application is a continuation-in-part application of U.S. application Ser. No. 980,419, filed Nov. 23, 1992, pending, entitled "Non-Contact Method Of Obtaining Dimensional Information About An Object."

TECHNICAL FIELD

This invention relates to non-contact methods for obtaining dimensional information about an object and, in particular, to laser scan methods for obtaining dimensional information about an object.

BACKGROUND ART

Circular features are often used as locating datums in manufacturing. Such features can be accurately produced with relative ease, and can be used to determine the position and orientation of parts. Part location is critical during machining since often a part must be removed from a machine and repositioned on the machine for subsequent machining operations. If part orientation is not precisely known, it is very difficult to accurately mate and assemble parts.

Laser scanning is a technique which is being used for capturing the geometry of engine parts such as combustion chambers, intake and exhaust ports. These features are complex free-form shapes and require many measurements to accurately describe them. Determining the precise location and orientation of these free form surfaces in the overall cylinder head can be quite difficult.

A coordinate measuring machine (CMM) is used to measure a part, and reference features are measured to establish the coordinate system for measuring other features of interest. However, CMM is mainly used for inspection of known parts and not for capture of free form geometry. CMM machines typically have algorithms to find features such as holes or edges from user supplied nominal locations. The process, however, is slow, interactive and operator intensive. In comparison, laser scanning is not highly interactive but it requires feature determination off-line through statistical processing.

The above-noted application discloses a method for finding the location of circular holes. However, there is a need to generalize and extend these teachings to allow the accurate determination of the orientation and location of such features as valves and valve guides.

SUMMARY OF THE INVENTION

It is an object of the present invention to provide a non-contact method which precisely determines dimensional information of a reference feature of an object which contains a planar or partially planar face.

In carrying out the above objects and other objects of the present invention, a method is provided for obtaining dimensional information of a reference feature of an object at a vision station, the reference feature having a planar or partially planar face. The method includes the step of providing a computer workstation including a computer and display screen connected to the computer and generating reference data relating to a surface of the object to be scanned. The surface includes the reference feature of the object. The reference feature has a boundary. The method also includes the steps of scanning a beam of controlled light at the surface of the object located at the vision station based on the reference data to generate reflected light signals and imaging the reflected light signals to a measuring area of a photodetector means to produce corresponding electrical signals proportional to the measurements. The method includes the steps of computing scan data having points based on the electrical signals, determining a reference plane for the reference feature from the scan data, selecting a patch on the reference plane, computing an equation of a plane which fits the patch, calculating the distance of all points in the scan data from the reference plane based on the equation of the plane to obtain distance data, displaying the distance data on the display screens in a histogram format, selecting a range of the distance data, displaying the scan data associated with the selected range of the distance data to determine if the reference plane has been properly determined, displaying a binary image in first and second colors, the first color representing distance data within the selected range and the second color representing colors outside the selected range, and selecting one of the first and second colors which represents the reference feature. The method also includes the steps of determining at least a portion of the boundary of the selected reference feature based on the scan data to obtain boundary data, and computing dimensional information associated with the at least one reference feature of the object based on the boundary data.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
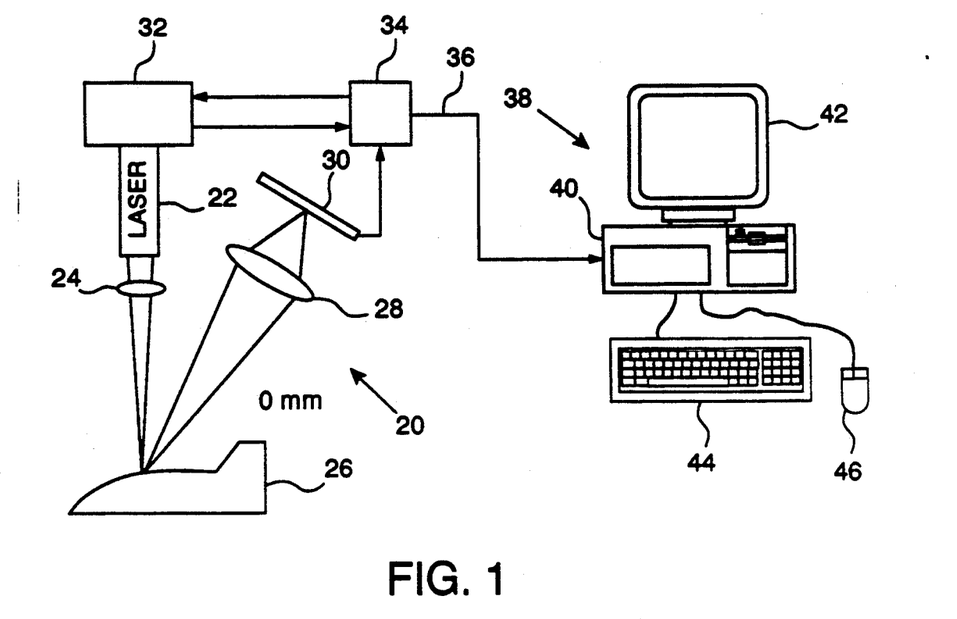
FIG. 1 is a schematic view of a laser scanner operation in accordance with the present invention.

Referring now to the drawing Figures, there is illustrated the method of the present invention. In FIG. 1, a laser scanner, generally indicated at 20, operates on the triangulation principle. A beam of laser light is generated by a laser 22 and is focused by a lens 24 on a part 26 being scanned to produce an illuminated spot of approximately 0.2 mm in diameter. An image of this spot is viewed by an "eye" or lens 28 that focuses the spot image on a sensor 30 mounted at an angle to the axis of the laser beam. The sensor 30 contains a linear array of 1024 photodetectors or photodiodes. The position at which the image of the spot falls on the array is a function of the distance of the point being scanned to the scanner 20. The number of photodetectors illuminated will vary as the angle of the surface of the part 26 varies. In general several photodetectors will be illuminated. The light intensity for each photodetector illuminated is used to compute the centroid of the spot image and thus achieve an accurate measurement independent of the surface angle. Since the size of the sensor 30 is limited, there is a limited range in which the scanner 20 can operate and maintain the spot image on the sensor 30.

This determines the depth of field for the scanner 20. A typical depth of field is 6 mm.

In operation, the laser scanner 20 is mounted in the spindle of a vertical machining center 32 and is moved over the surface of the part 26 being scanned by the center's X and Y axes in a series of linear scans.

The laser scanner 20 communicates with a controller 34 of the machining center 32 and adjusts the Z axis to maintain the scanner 20 within a 6 mm depth of field. The Z dimension returned along a line 36 from the scanning system is then the algebraic sum of the Z axis servo move and the position given by the laser scanner 20. The Z dimension is input to a computer workstation, generally indicated at 38. The workstation 38 includes a chassis 40, a display screen 42, a keyboard 44 and a mouse 46, all connected in a typical fashion. The workstation is programmed to have a graphical user interface.

A prediction algorithm may be employed to move the scanner 20 up or down based on the last series of points scanned. This system works effectively for smoothly varying contours of parts and allows up to 70 points a second to be scanned. However, when a discontinuity in the surface of a part is encountered, like the vertical wall of a hole, the system must search up and down until the spot falls on the sensor. This searching is the most time consuming part of the scanning operation since it may take several seconds for the system to search out the new depth if the change is large.

When scanning a part, a user first defines the polygonal boundary of the area of the part 26 to be scanned (preferably up to 100 points). This boundary may be defined by inputting X,Y coordinates or by moving the laser probe to the points in a "teach" mode. This distance between points along a scan and the distance between scan lines is also user selectable down to 0.02 min. Rectangular grids are usually specified but are not required.

GENERAL DESCRIPTION OF THE METHOD

The method consists of a process of several steps. The combination of the steps produces a very powerful technique for finding analytic features.

1. Determine a reference plane for the feature. Sometimes the feature will be contained in the reference plane, as for example in the case of a valve guide. At other times, the feature will be above or below the reference plane. For example, the plane of the valve guide of a valve opening will be above the reference plane.
2. Pick or select a rectangular path on the reference plane. An interactive graphics package IDL (Interactive Data Language) with a graphical user interface is used to select a patch on the reference plane.
3. Compute the equation of a plane which best fits the data in a least squares sense. Take all points that are close (within a given tolerance) of this plane. Use this new set of data to recompute the equation of the plane. This step makes the final plane much less dependent on the choice of the initial plane.
4. Calculate the distance of all points in the scan data set from this reference plane. Display this derived distance data in a histogram format and allow the user to select a range from the histogram. In general, peaks on the histogram will correspond in an obvious fashion to features.
5. Divide the scan data into two subsets. Those within the chosen range from the histogram and the rest. Display this binary data with two colors. This step enables the user to visually determine if he has accurately determined the plane. If the plane has not been correctly determined, the user may return to step 2 and repeat the procedure.
6. Divide the distance data into two subsets. Those points whose derived distances are within the selected range, and those outside it. Display the resulting binary image in two colors, for example, black and white. If the image correctly defines the desired feature, continue and allow the user to select either color. Otherwise, return to the previous step and select a new range from the histogram.
7. Usually a color of the desired image will contain more than one feature. An algorithm called SCCA (Sequential Connected Components Algorithm) is used to discriminate between the features. The distinct features are then displayed with different colors. The user can then use the graphical interface to pick only the feature of interest.
8. An algorithm is then used to calculate the boundary points of the feature. If the feature is in a horizontal plane, the methods discussed in the above-noted application can be used to calculate the precise dimensions of the analytic feature (circle or ellipse). If not, then the data can be mapped to a horizontal plane and the previous methods can be used.

FINDING AND VERIFYING THE REFERENCE PLANE

Figure 2:
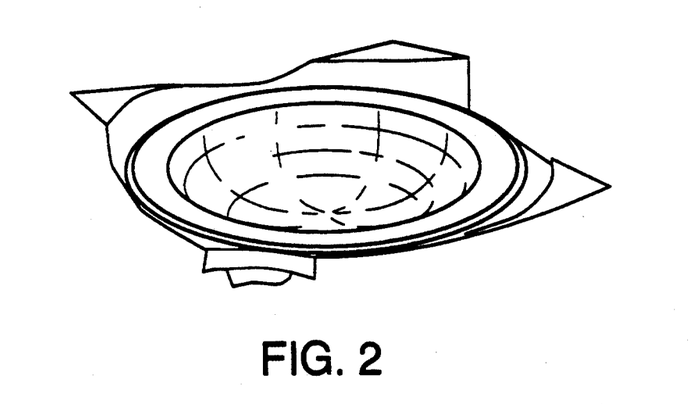
FIG. 2 is an illustration of a valve with a planar face.
Figure 3:
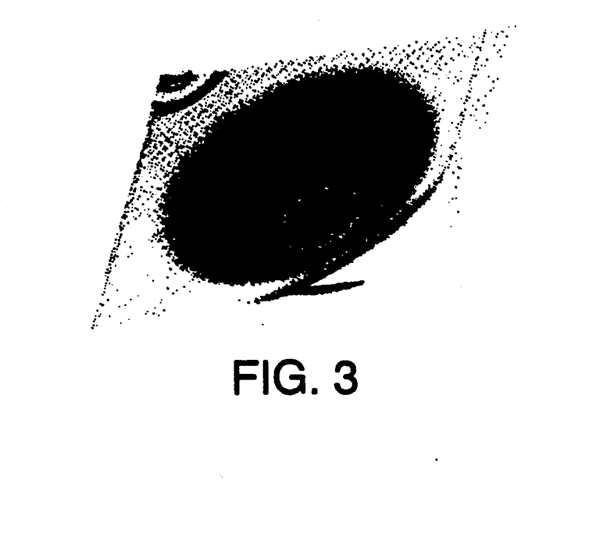
FIG. 3 is an illustration of a valve hole.

The feature may be embedded in this reference plane for example the planar face of a valve as in FIG. 2 for example, or may be characterized by falling away very sharply from the reference plane. This second case occurs when finding a valve location from a valve hole as in FIG. 3. In this case, either the top plane of the valve opening can be used or the plane determined by the valve guide.

Figure 4:
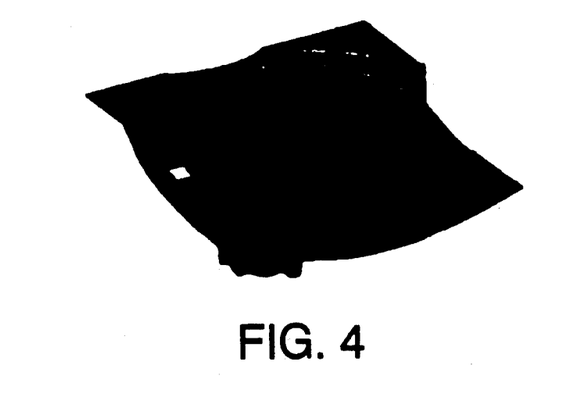
FIG. 4 is an illustration of a selected rectangular planar area.
Figure 5:
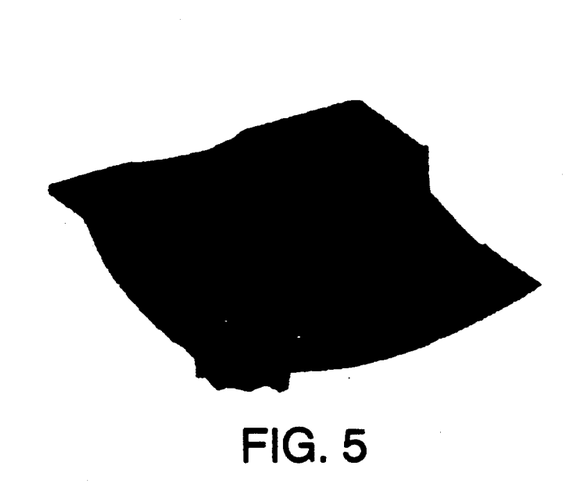
FIG. 5 is an illustration of an area (light area) within tolerance of the plane.

In either case, a graphical user interface is used to pick a small rectangular patch on the reference plane. Then least-squares techniques are used to find a mathematical equation which best represents this reference plane. The user can select a tolerance and all points which are within this tolerance are then considered to be on this reference plane. The user is given graphical feedback so he can visually determine whether or not the reference plane is accurate enough to continue with the feature finding process. FIG. 4 shows a small patch on the reference plane of a locating hole. FIG. 5 indicates all points that are within tolerance of this plane. As FIG. 5 shows, the reference plane does a good job of identifying the planar portion of the valve. If the reference plane is not satisfactory, the user can pick a new reference patch. It may be necessary to increase the tolerance to get a good reference plane.

COMPUTING THE HISTOGRAM AND ITS USE

The signed distance of each point from the plane can be determined from the following formula:

$$dist(z) = (z - (a^*x + b^*y + c))/\sqrt{a^2 + b^2 + 1} \quad (1)$$

where the equation of the plane is $$z = a^*x + b^*y + c \quad (2)$$

Figure 6:
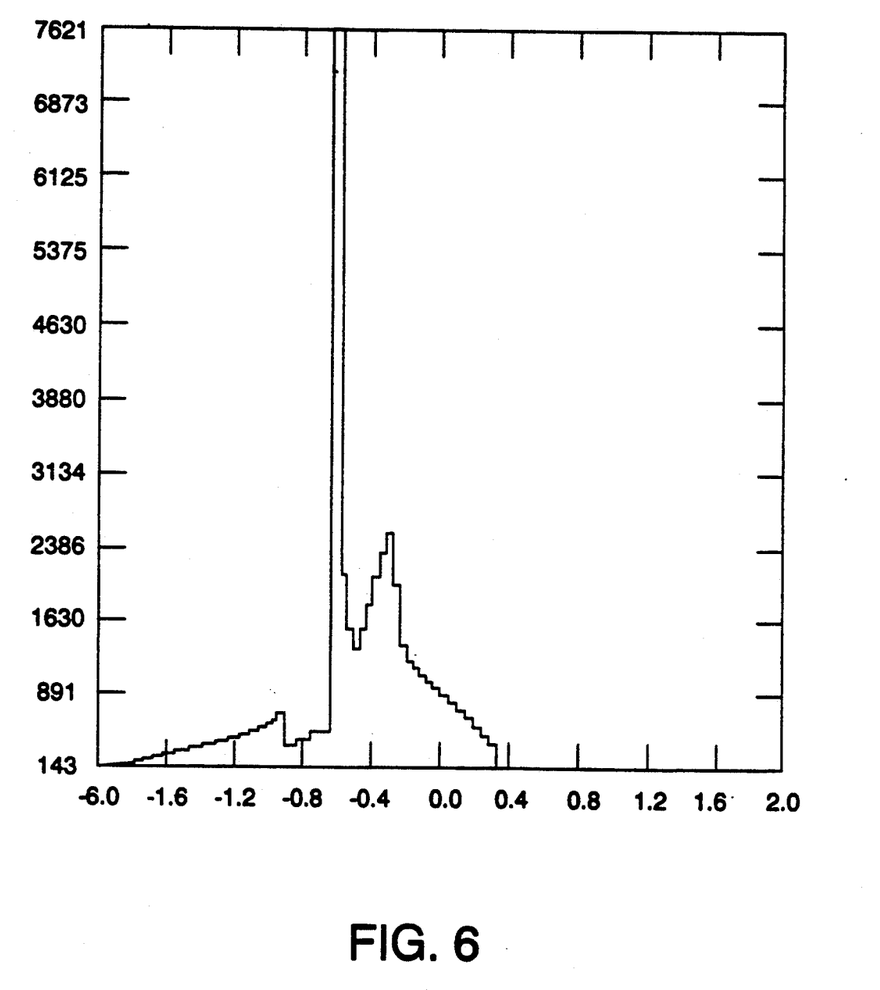
FIG. 6 is an illustration of a histogram of distances from the plane.
Figure 7:
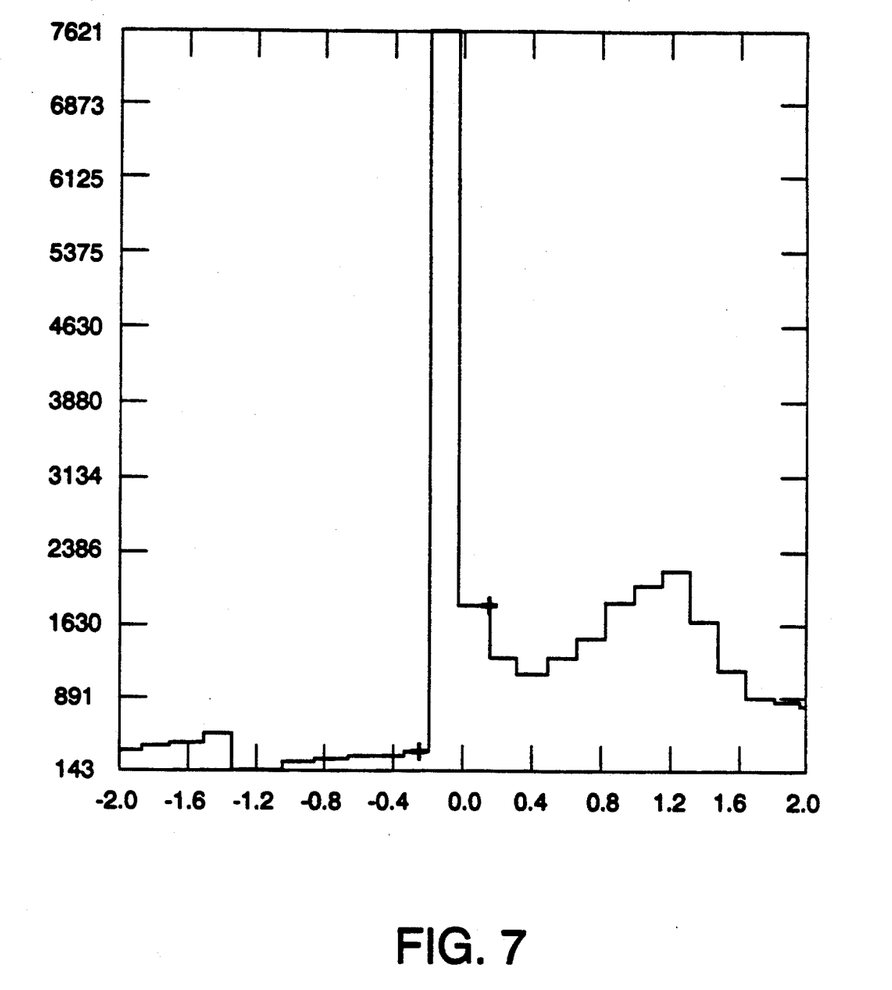
FIG. 7 is an illustration of a subset of the histogram of FIG. 6 with a selected range.

This information is then presented to the user in histogram format as in FIG. 6. The user can then select a range of the histogram to determine the precise feature location. FIG. 7 shows a subset of the original histogram. The crosses in FIG. 7 show the interval:

$$-0.38 \leq dist \leq 0.15 \quad (3)$$

where dist is defined as in equation 1. The interval was selected so that it includes a range about 0.0.

Figure 8:
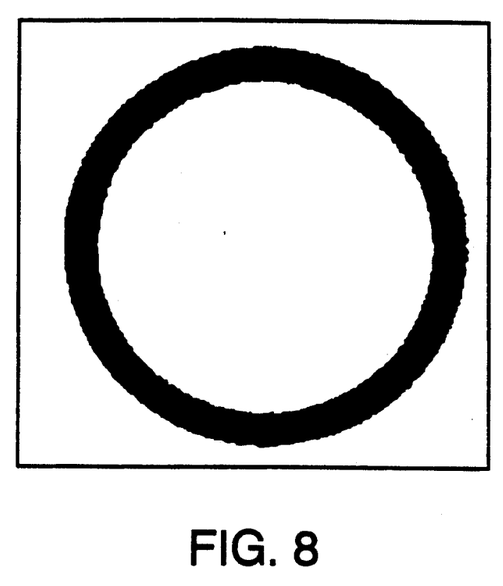
FIG. 8 is an illustration of a binary image.
Figure 9:
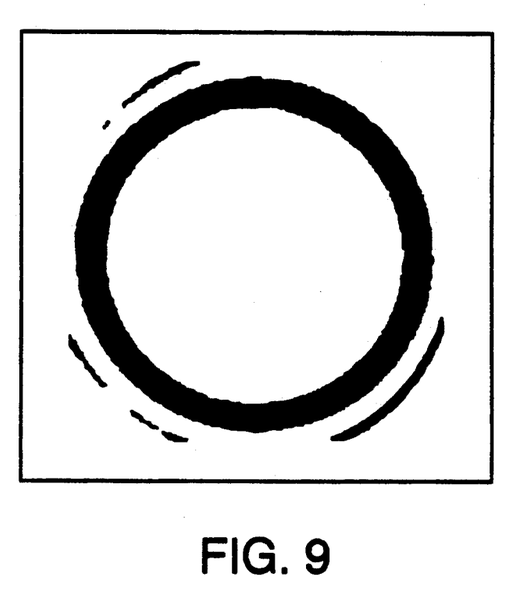
FIG. 9 is an illustration of a component's image with noise.
Figure 10:
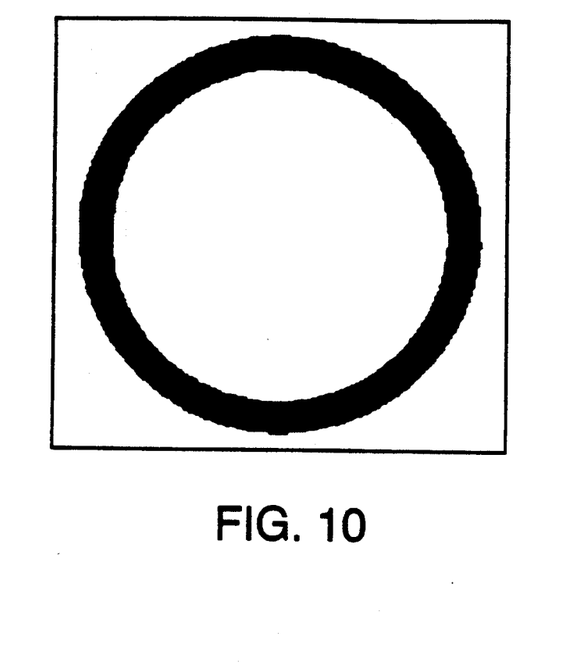
FIG. 10 is an illustration of a preferred component such as a valve.
Figure 11:
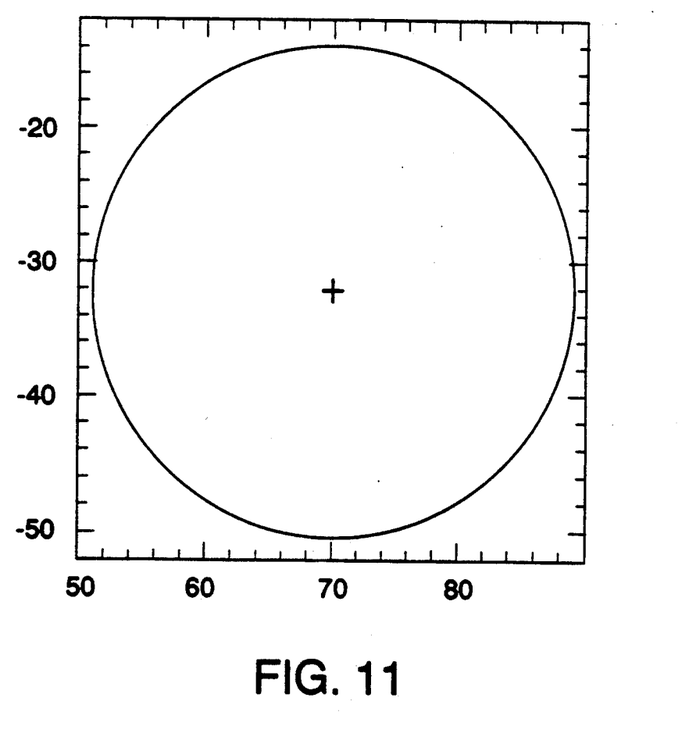
FIG. 11 is an illustration of a boundary of a valve face.
Figure 12:
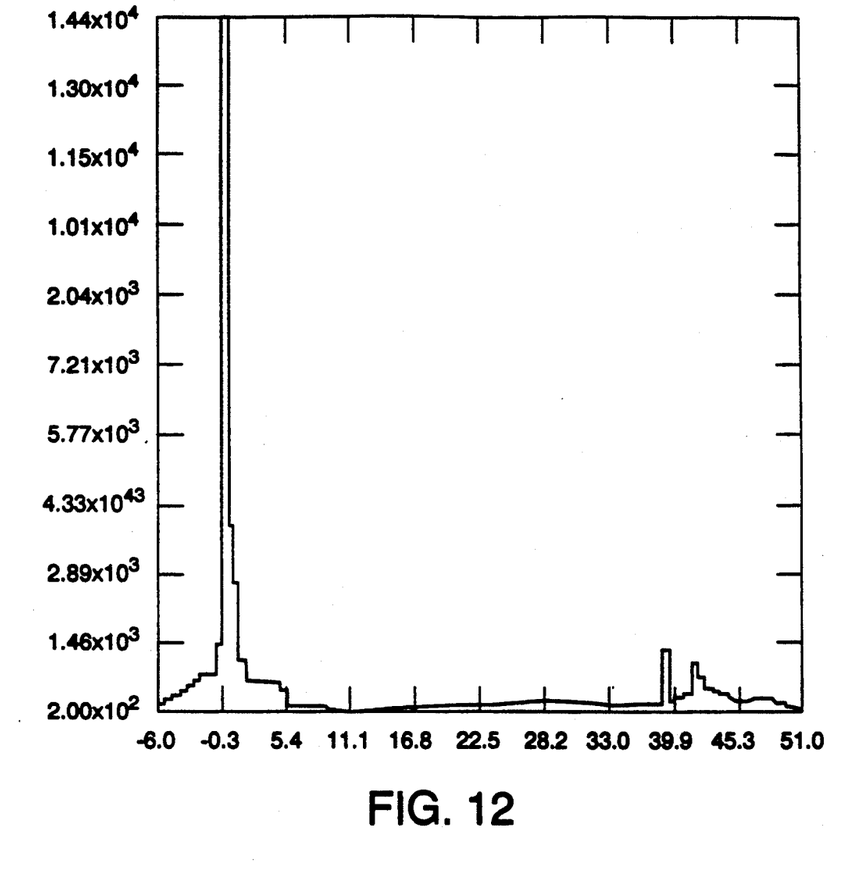
FIG. 12 is an illustration of a histogram of a valve opening with three humps.
Figure 13:
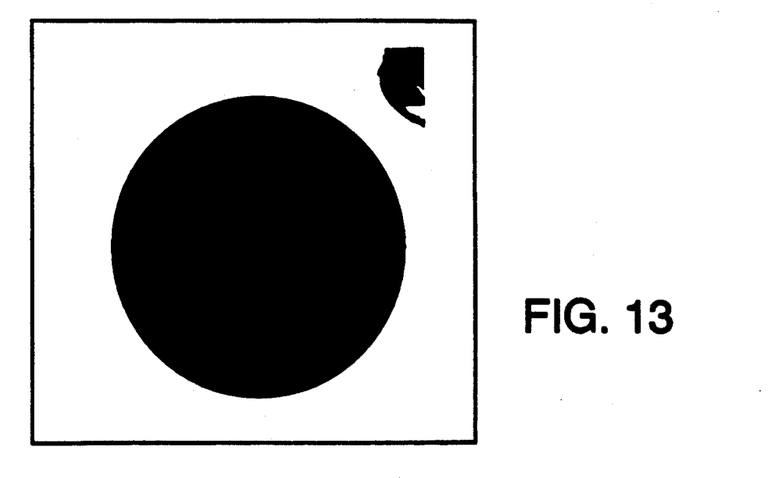
FIG. 13 is an illustration of components of a valve opening.
Figure 14:
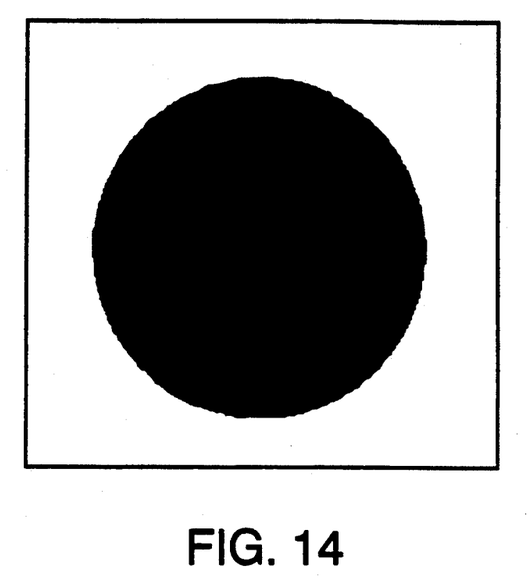
FIG. 14 is an illustration of a valve opening.
Figure 15:
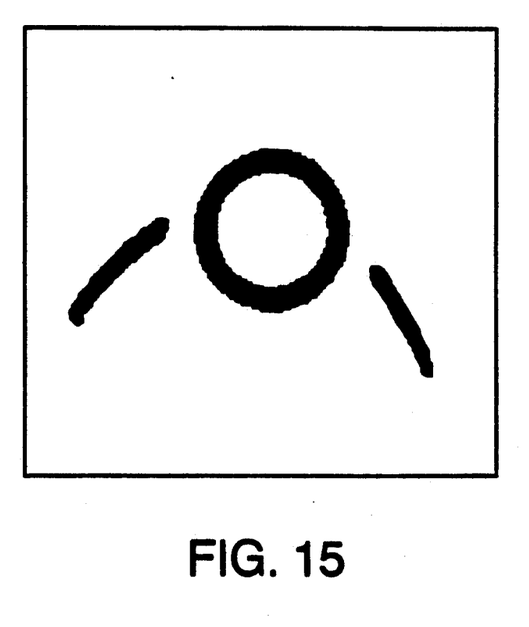
FIG. 15 is an illustration of components of a valve guide (i.e., top)
Figure 16:
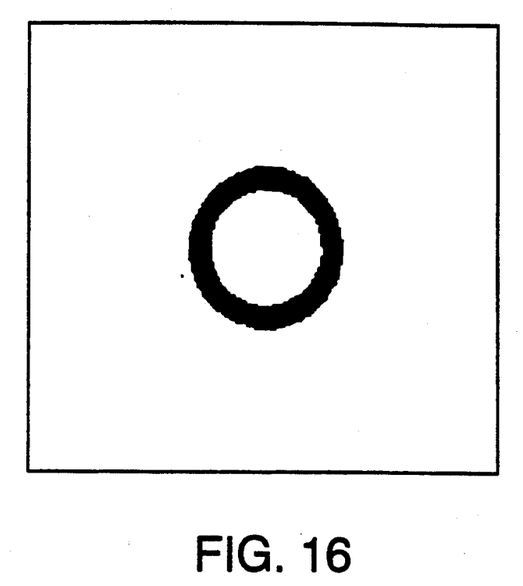
FIG. 16 is an illustration of a valve guide (i.e., top)
Figure 17:
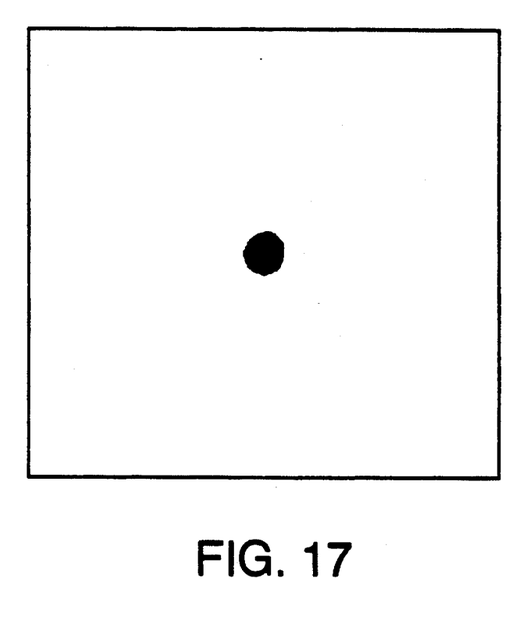
FIG. 17 is an illustration of components of a valve guide (i.e., bottom)
Figure 18:
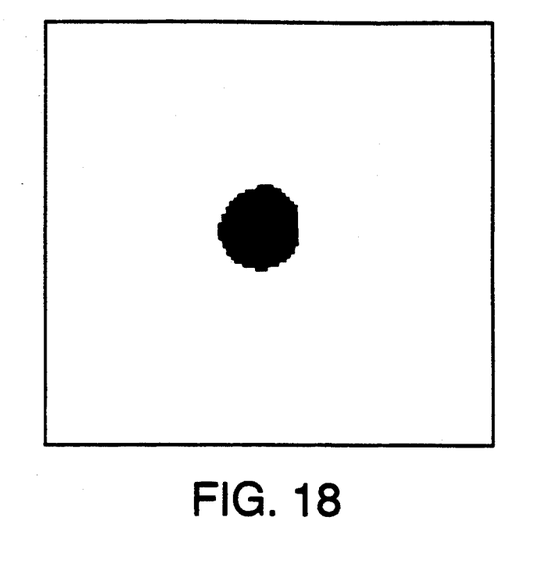
FIG. 18 is an illustration of a valve guide (i.e., bottom)

The selected range from the histogram is then used to create a derived binary image as follows. All points whose distances are within the given range on the histogram are set to 0. All other points are set to 1. FIG. 8 shows this binary image. At this point, the user can select either the black image or the white image. If the user selects black from FIG. 8, subsequent processing will enable determination of the radius of the valve. If white is selected, the user will be able to determine the radius of the valve portion which is interior to the planar portion. FIG. 9 shows the components of the valve face as determined by the SCCA algorithm. FIG. 10 shows the results of picking the annular region from the previous Figure. FIG. 11 shows the outer boundary of this annulus, which corresponds to the boundary of the valve. FIG. 11 shows the histogram of the valve opening. The three humps in this histogram correspond (from left to right to the valve opening, and the top and bottom of the valve guide). FIGS. 15 through 18 and corresponding Tables A through C show the analysis of this histogram.

TABLE A

Results for the Valve Opening

| Center Coordinates | Millimeters |
|---|---|
| $x_o$ | −174.28 |
| $y_o$ | 3.48 |
| $z_o$ | 1.65 |
| Diameter | 33.89 |

TABLE B

Results for the Top of the Valve Guide

| Center Coordinates | Millimeters |
|---|---|
| $x_o$ | −174.20 |
| $y_o$ | 3.52 |
| $z_o$ | 1.65 |
| Diameter | 11.08 |

TABLE C

Results for the Bottom of the Valve Guide

| Center Coordinates | Millimeters |
|---|---|
| $x_o$ | −174.20 |
| $y_o$ | 3.60 |
| $z_o$ | 1.65 |
| Diameter | 4.07 |

SCCA

If we assume the user has chosen black from FIG. 8, a method is necessary to indicate to the computer which black area should be analyzed since the screen contains several black areas. (A similar problem occurs if white is chosen). A convenient method for allowing the user to pick exactly the feature he desires is necessary. Fortunately, there is an algorithm from binary image processing which can be used called SCCA (Sequential Connected Components Algorithm) as described by Ramesh Jain and Brian G. Schunck in *Machine Vision*, University of Michigan, 1990. Since the previous image contains exactly 2 values 0 and 1, it corresponds in a natural way to a binary image. Then SCCA can be used to number the connected components in the derived binary image, and each component can be displayed in a different color. FIG. 9 shows these components (here color has been replaced by gray-scale), and the components are clearly differentiated. The user can then select the large gray component to indicate the valve.

FINDING THE FEATURE BOUNDARY

Once the geometric feature has been determined, it is necessary to determine the boundary points. At this point, another algorithm from binary image processing can be used to calculate the border of the feature as described in the above-noted book at page 54. If the geometric feature has a circular boundary in a plane $z = c$ for some constant c, i.e. a horizontal plane, then the results of the above-noted application can be used to calculate the parameters of this circle. In general, however, the feature will not be in a horizontal plane.

FINDING THE FEATURE BOUNDARY FOR A FEATURE EMBEDDED IN AN ARBITRARY PLANE

In this case, one uses the boundary points of the feature to determine the equation of a least squares plane such as $z = a^*x + b^*y + c$. Then, the vector:

$$n = a, b, -1 \quad (4)$$

will be normal to this plane. One may assume that at least one of a and b is $\neq 0$, since otherwise the data is already in a horizontal plane. If we assume that $a \neq 0$, then the vector:

$$v = -1, 0, a \qquad (5)$$

will be orthogonal to $n_1$ and if we define $$n = nwx \qquad (6)$$

where x represents the cross product. Then the vectors u,n,w can be normalized to provide an orthonormal transformation o that will preserve distance. This transformation can the be used to map the boundary points into a horizontal plane, which reduces the problem to the previous case. (The inverse of the transformation o can then be used to map the precise position of the circle or ellipse back to the original coordinate system).

VERIFICATION OF THE METHOD

In order to check the accuracy of the method, a combustion chamber of a 4.6 Liter 2 valve engine was scanned at a density of 0.1 mm. The valves were removed from the chamber and the method was used to determine the precise position and orientation of the valve guides for both the intake and exhaust valves. (The valve guides are used to hold the valves in a precise orientation). In the following tables, the methods presented herein will be called the "Histogram" method.

TABLE D

| Histogram Method Results for the Exhaust Valve Guide | |
|---|---|
| Center Coordinates of Top of Guide | Millimeters |
| $x_o$ | 25.00 |
| $y_o$ | 60.80 |
| $z_o$ | −36.95 |
| y coordinate of pierce point | 53.67 |
| diameter | 11.37 |
| angle of inclination | 11.04 |

TABLE E

| Histogram Method Results for the Intake Valve Guide | |
|---|---|
| Center Coordinates of Top of Guide | Millimeters |
| $x_o$ | 71.07 |
| $y_o$ | 60.70 |
| $z_o$ | −37.14 |
| y coordinate of pierce point | 53.48 |
| diameter | 11.23 |
| angle of inclination | 11.21 |

TABLE F

| Data for the Exhaust Valve Guide from the Part Print | |
|---|---|
| Center Coordinates | Millimeters |
| $x_o$ | 25.00 |
| y coordinate of pierce point | 53.50 |
| angle of inclination | 11.00 |

TABLE G

| Data for the Intake Valve Guide from the Part Print | |
|---|---|
| Center Coordinates | Millimeters |
| $x_o$ | 71.00 |
| y coordinate of pierce point | 53.50 |
| angle of inclination | 11.00 |

TABLE H

| CMM Measurements for the Exhaust Valve Guide | |
|---|---|
| Center Coordinates | Millimeters |
| $x_o$ | 25.02 |
| y coordinate of pierce point | 53.54 |
| angle of inclination | 10.998 |

TABLE I

| CMM Measurements for the Intake Valve Guide | |
|---|---|
| Center Coordinates | Millimeters |
| $x_o$ | 70.99 |
| y coordinate of pierce point | 53.56 |
| angle of inclination | 11.007 |

Comparison of the histogram method results, and CMM measurements shows that the histogram method agrees very closely with the values from the CMM. (Within 0.1 mm in position and 0.2 degrees in computing the angle of inclination).

CONCLUSION

The precise location of analytic features such as intake and exhaust valves, and valve guides can be determined by using the methods described herein. Valve inclination and size can also be determined.

DETERMINATION OF THE HOLE RADIUS

Without loss of generality, it is assumed that a hole of interest in a part has its center at the origin (0.0,0.0) in the cartesian coordinate system. One wishes to find the best estimate for the radius of the hole given scan data as input. The data is given by $x_1, x_2, \ldots, x_n$ and $y_1, y_2, \ldots, y_n$, where $x_i$ and $y_i$ are the x and y coordinates of points on the circular boundary of the hole. By using the least squares approach, a value of r that minimizes the following error sum is sought:

$$\sum_{i=1}^{n} (x_i^2 + y_i^2 - r^2)^2 \qquad (7)$$

The value of r which minimizes the error as given in Equation (7) is:

$$r = \sqrt{\frac{\sum_{i=1}^{n}(x_i^2 + y_i^2)}{n}} \qquad (8)$$

The real world problem is slightly different however since it is very difficult to determine which points lie exactly on the boundary of the hole. (For sake of simplification, one may assume that the circle is the boundary of a hole which has been drilled into a flat block.) In general, it is difficult to find the boundary of the hole without human intervention. By using laser scanning techniques, one can determine whether a point is outside the hole or inside the hole based on its z coordinate, since the points inside the hole have a lower z coordinate than those outside.

Figure 19:
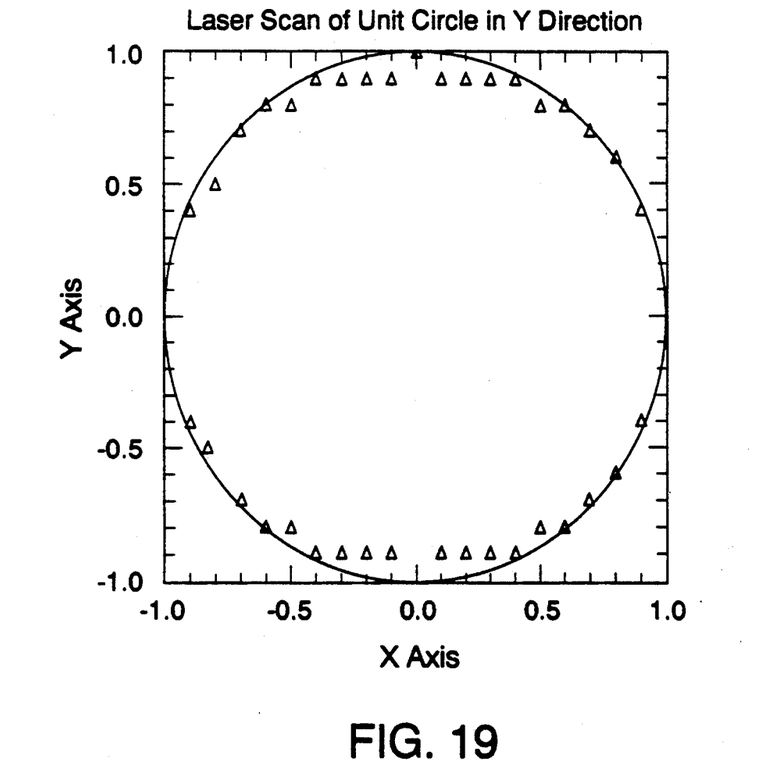
FIG. 19 is a graph illustrating the interior boundary points resulting from a laser scan of unit circle in the Y direction.

Referring now to FIG. 19, there is illustrated a graph of interior boundary points of a circle with scanning done in the Y direction. The radius of the circle is found by basing an estimate on points in the interior of the circle, but the same techniques can be applied to the exterior points.

By using the laser scanner 20, one can determine those points inside the circle which are closest to the boundary, i.e. a point is "near" the boundary of the circle if either the previous or next point is outside the circle. These points are the first point and last point inside the circle for a given scan line. The scan data consists of z coordinates of a rectangular grid in x,y, and the increments in the x and y directions are given by $\Delta x$ and $\Delta y$.

For example, one can consider the first quadrant of the circle (i.e. the region where x and y are non-negative) and compare the observed value for the radius, $r_{observed}$, with the actual value, $r_{actual}$. If one considers scan lines with x fixed and y varying, the theoretical estimate is given by Equation (7) for $x_i, y_i$ where x and y are the coordinates of the intersection of the scan lines with the circle in the first quadrant. The experimental estimate, however, is given by:

$$r_{observed} = \sqrt{\frac{\sum_{i=1}^{n}(x_{observed}^2(i) + y_{observed}^2(i))}{n}} \quad (9)$$

Clearly $$r_{observed} < r \quad (10)$$

However, one wishes to calculate an estimate for r which is better than $r_{observed}$. For sake of simplicity, $r^2$ and $r^2_{observed}$ are utilized as follows:

$$r_{observed}^2 = \frac{\sum_{i=1}^{n}(x_{observed}^2(i) + y_{observed}^2(i))}{n} \quad (11)$$

Since x is fixed along each scan line, $$x_{observed}(i) = x_{actual}(i); \quad (12)$$

$$y_{observed}(i) = y_{actual}(i) - error_i * \Delta y; \quad (13)$$

and $$0 <= error_i < 1 \text{ for } 1 <= i <= n \quad (14)$$

If Equation (13) is squared, one obtains:

$$y_{observed}^2(i) = y_{actual}^2(i) - 2*error_i*y_{actual}(i)*\Delta y + \Delta y^2 \quad (15)$$

Since $\Delta y$ is assumed to be small, one has:

$$\Delta y^2 << \Delta y \quad (16)$$

and $$y_{observed}^2(i) \approx y_{actual}^2(i) - 2*error_i*y_{actual}(i)*\Delta y \quad (17)$$

By comparing the Equations (11) and (17) one obtains:

$$r_{observed}^2 \approx \frac{\sum_{i=1}^{n}(x_i^2 + y_i^2)}{n} - 2*\Delta y * \frac{\sum_{i=1}^{n} error_i*y_i}{n} \quad (18)$$

$$\approx r_{actual}^2 - 2*\Delta y * \frac{\sum_{i=1}^{n} error_i*y_i}{n} \quad (19)$$

If one assumes that error and y are roughly statistically independent, and that the function error is approximately uniformly distributed, then one can replace error in the summation by its average value ½. One obtains:

$$r_{observed}^2 \approx r_{actual}^2 - \Delta y * \frac{\sum_{i=1}^{n} y_i}{n} \text{ and} \quad (20)$$

$$\frac{\sum_{i=1}^{n} y_i}{n} \approx \int_o^r y\,dx = \int_o^r \sqrt{r^2 - x^2}\,dx \quad (21)$$

where r is the actual radius of the circle and for the first quadrant $$y = \sqrt{r^2 - x^2} \quad (22)$$

The value of the integral is $r * \pi/4$, which gives:

$$r_{observed}^2 \approx r_{actual}^2 - \frac{r_{actual}*\pi\Delta y}{4} \quad (23)$$

The following expression for the actual radius in terms of the observed radius is obtained:

$$r_{actual} = \frac{b + \sqrt{b^2 + 4r_{observed}^2}}{2} \text{ where} \quad (24)$$

$$b = \frac{\pi\Delta y}{4} \quad (25)$$

Without loss of generality, Equation (23) can be used with x,y data taken from the entire circle, and not restricted to the first quadrant. If one assumes that $r_{observed}$ is very close to $r_{actual}$, then the following relationship from Equation (23) is obtained:

$$r_{actual} = \sqrt{r_{observed}^2 + r_{observed}\frac{\pi\Delta y}{4}} \quad (26)$$

This equation is easier to use and gives almost the same results as Equation (23) as long as $r_{observed}$ is relatively close to $r_{actual}$ (i.e. within 1%). If boundary points on the outside of the circle instead of the inside the circle are used, a similar relationship between $r_{actual}$ and $r_{observed}$ is obtained, except that the correction factor $$r_{observed}\frac{\pi\Delta y}{4} \quad (27)$$

must be subtracted instead of added. This yields:

$$r_{actual} = \sqrt{r_{observed}^2 - r_{observed}\frac{\pi\Delta y}{4}} \quad (28)$$

DETERMINING $r_{observed}$

The initial assumption was that the center of the hole is at the origin. This was used to calculate $r_{observed}$. If this is not true, $r_{observed}$ and the center of the hole $x_o, y_o$ must be calculated by other methods. In this case, a modification of the Levenberg-Marquardt algorithm which eliminates the need for explicit derivates can be used to recursively determine the center and radius of the hole from the boundary points.

The Levenberg-Marquardt algorithm solves non-linear least squares problems by starting with an initial estimate $X^o$ for the minimum point. A sequence of approximations to the minimum X is generated by the following:

$$X^{n+1} = X^n - [a_n D_n + J_n^T J_n]^{-1} J_n^T f(X^n) \quad (29)$$

where:

$J^n$ is the numerical Jacobian matrix evaluated at $X^n$;

$D_n$ is a diagonal matrix equal to the diagonal of $J_n^T J_n$;

$a_n$ is a positive scaling constant; and f is a vector function to be minimized.

This method is used to determine the parameters $x_o, y_o$ and $r_{observed}$ which minimize the following sum:

$$\sum_{i=1}^{n} [(x_i - x_o)^2 + (y_i - y_o)^2 - r_{observed}^2]^2 \quad (30)$$

Boundary points P are eliminated where $[\text{dist}(P,X) - R] > 2.4^*\sigma$, where X represents the center of the hole, R the radius, and $\sigma$ is the standard deviation of dist(P,X)−R, and 2.4 is a number from the normal distribution which corresponds to a 98% confidence interval.

The correction factor is applied to obtain a better estimate for the radius which takes into account that the "boundary points" are not really in the boundary of the circular feature.

While the best mode for carrying out the invention has been described in detail, those familiar with the art to which this invention relates will recognize various alternative designs and embodiments for practicing the invention as defined by the following claims.

I claim:

1. A method for obtaining dimensional information of a reference feature of an object at a vision station, the reference feature having a planar or partially planar face, the method comprising the steps of:

providing a computer workstation including a computer and display screen connected to the computer;

generating reference data relating to a surface of the object to be scanned, the surface including the reference feature of the object, the reference feature having a boundary;

scanning a beam of controlled light at the surface of the object located at the vision station based on the reference data to generate reflected light signals;

imaging the reflected light signals to a measuring area of a photodetector means to produce corresponding electrical signals proportional to the measurements;

computing scan data having points based on the electrical signals;

determining a reference plane for the reference feature from the scan data;

selecting a patch on the reference plane;

computing an equation of a plane which fits the patch;

calculating the distance of all points in the scan data from the reference plane based on the equation of the plane to obtain distance data;

displaying the distance data on the display screen;

selecting a range of the distance data;

displaying the scan data associated with the selected range of the distance data to determine if the reference plane has been properly determined;

displaying a binary image in first and second colors, the first color representing distance data within the selected range and the second color representing distance data outside the selected range;

selecting one of the first and second colors which represents the reference feature;

determining at least a portion of the boundary of the selected reference feature based on the scan data to obtain boundary data; and computing dimensional information associated with the at least one reference feature of the object based on the boundary data.

2. The method of claim 1 wherein the reference feature is contained in the reference plane.

3. The method of claim 1 wherein the steps of selecting are performed with the computer programmed with an interactive graphics package.

* * * * *